United States Patent [19]

Sokal et al.

[11] Patent Number: 4,719,559
[45] Date of Patent: Jan. 12, 1988

[54] CURRENT-MODE CONTROL OF CAPACITIVELY COUPLED POWER CONVERTERS

[75] Inventors: Nathan O. Sokal, Lexington; Richard Redl, Arlington, both of Mass.

[73] Assignee: Cherry Semiconductor Corporation, Greenwich, R.I.

[21] Appl. No.: 922,006

[22] Filed: Oct. 22, 1986

[51] Int. Cl.⁴ .............................................. H02M 7/44
[52] U.S. Cl. ......................................... 363/98; 363/132
[58] Field of Search ...................... 363/17, 56, 57, 58, 363/98, 132, 136

[56] References Cited

U.S. PATENT DOCUMENTS

| 4,429,359 | 1/1984 | Anderson et al. | 363/132 |
| 4,456,872 | 6/1984 | Froeschle | 323/286 |
| 4,523,267 | 6/1985 | Mehl | 363/132 X |
| 4,541,041 | 9/1985 | Park et al. | 363/98 X |
| 4,631,653 | 12/1986 | Small | 363/98 X |

OTHER PUBLICATIONS

Redl, Richard & Nathan O. Sokal: Current-Mode Control, Five Different Types, Used with the Three Basic Classes of Power Converters: Small-Signal AC and Large-Signal DC Characterization, Stability Requirements, and Implementation of Practical Circuits, Jun. 1985, 1985 IEEE Power Electronics Spec. Conf., Toulose, France.

Primary Examiner—Patrick R. Salce
Assistant Examiner—Marc S. Hoff
Attorney, Agent, or Firm—Robert M. Asher

[57] ABSTRACT

A circuit for enabling current mode control to be used with a capacitively coupled power converter. The circuit includes circuitry for comparing the voltage across a coupling capacitor with its intended voltage and for generating an unbalance signal corresponding to any deviation. The unbalance signal and an inverse of the unbalance signal are alternately provided to the current mode controller to modify the control of two switches or two pairs of switches in the power converter so as to reduce the unbalance.

18 Claims, 9 Drawing Figures

CURRENT-MODE CONTROL OF CAPACITIVELY COUPLED POWER CONVERTERS

BACKGROUND OF THE INVENTION

This invention relates to the use of the current-mode-control circuitry for a widely used class of power converter circuits.

Current mode control is described in detail in "Current-mode control, five different types, used with three basic classes of power converters: small-signal ac and large-signal dc characterization, stability requirements, and implementation of practical circuits," by Richard Redl and Nathan O. Sokal, in the PESC '85 Proceedings [IEEE Publication 85CH2117-0], pp. 771-785. This article is hereby incorporated by reference herein. The invention is needed in instances when the controller controls the magnitudes of currents flowing into and out of coupling capacitors in those power-converter circuits. In particular, the power-converter circuits which are the subject of the present invention include at least two periodically operated control switching devices which are turned on sequentially. The loads on these power-converter circuits are driven through one or more coupling capacitors. These capacitively coupled converter circuits include switching-mode dc/dc power converters and switching-mode dc/ac power inverters.

According to the teachings of the prior art, current-mode control could not be used with capacitively coupled power converters because the capacitor voltage would "run away" if one attempted to use current-mode control with this class of power converter. This run-away problem has been noted in the *Unitrode Applications Handbook*, 1985-86, pages 278-291. The reason for voltage run-away is as follows. The magnitudes and durations of the pulses of current into and out of the coupling capacitor nominally are kept equal by the current-mode controller. However, there is always a small unintended difference between the charges injected and withdrawn via the two (or for full-bridge converters, two pairs of) switches which drive alternately positive and negative currents into the coupling capacitor. Such differences can be produced by differences of switching times of the two switches, by differences of propagation delays in the signal paths to the two switches, or by subharmonic oscillation of the voltage-regulating loop. The small difference of charge injected and withdrawn results in a small dc current in the circuit branch whose current is being controlled. The dc current causes drift of the voltage across the coupling capacitor. The drift continues until the circuit reaches a steady-state condition which depends on the specific circuit design and circuit parameters. In practical cases, that steady-state operating condition can be far enough from the desired operating condition to be a serious detriment to the circuit operation.

The object of the present invention is to prevent the run-away of voltage across the coupling capacitor, so that the otherwise desirable current-mode control can be used with capacitively coupled power converters.

SUMMARY OF THE INVENTION

The invention is directed to a circuit that enables the use of current-mode control with capacitively coupled power converter circuits. The circuitry of the present invention includes a mechanism for sensing the deviation of the capacitor voltage away from the desired value (hereafter "voltage unbalance" for brevity) to produce an unbalance signal which is a monotonic function of the voltage unbalance. Circuitry is provided for processing the unbalance signal and for generating a modification signal. The modification signal is provided to the current-mode controller to reduce the voltage unbalance.

In accordance with the present invention, current-mode control can be used with capacitively coupled power-converter circuits. Current-mode control has many advantages over other methods of controlling switching-mode power-converter circuits Current-mode control advantageously provides a more stable control loop, higher-speed control, less disturbance of output voltage by transients changes of output load or input voltage, and smaller size and lower cost of output energy-storage capacitor for a given level of dynamic performance, as compared to the prior art of duty-ratio control. In addition, current-mode control of the switch currents in this class of power conditioners has the advantage that the switch currents are controlled directly, including protection from the possible deleterious effects of transformer magnetizing current.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
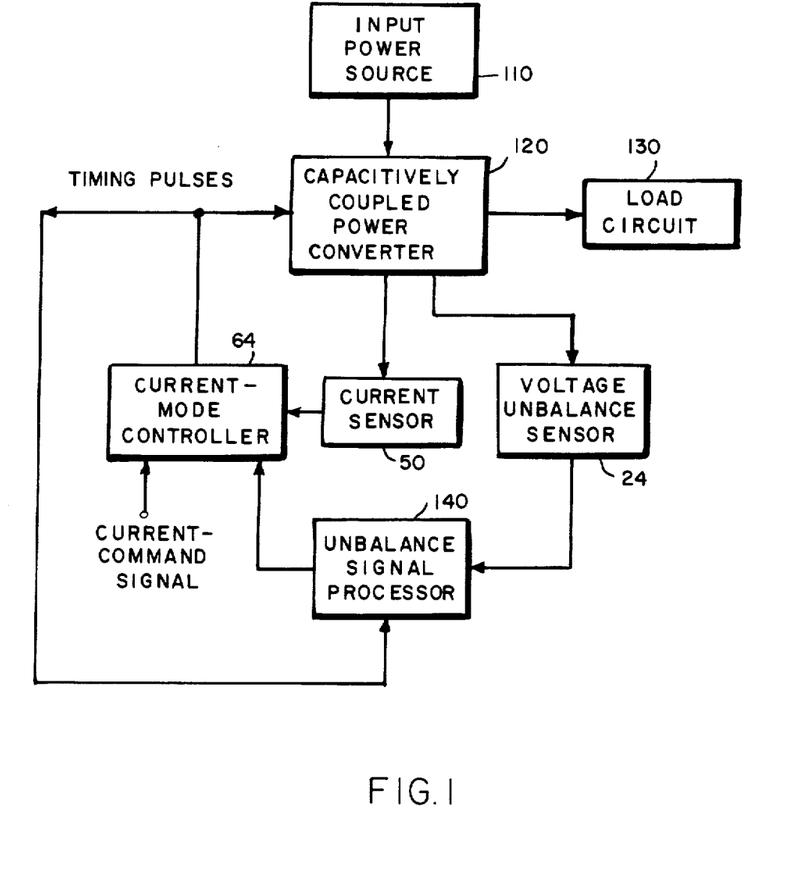
FIG. 1 is a functional block diagram of a system which includes the present invention.

Referring now to the drawings, FIG. 1 is a block schematic of a capacitively coupled, current-mode-controlled, power converter system.

An input power source 110 supplies electrical power to the input of a capacitively coupled power converter 120, which processes the power and supplies power to a load circuit 130. As shown on FIG. 2, a load circuit 130 includes a load 19 and any additional components which provide additional functions such as coupling, dc isolation, impedance transformation, rectification and filtering. A power converter 120 of the type considered herein typically includes two or more switches used in converting the input power into a form acceptable for the load. Capacitive coupling means that there is a capacitance (one or more capacitors) in the path between the power source 110 and the load circuit 130. If there is a net dc component of the current flowing in the coupling capacitance, the capacitor voltage will unbalance from its intended value, and the circuit will drift to an unbalanced condition. The unbalance voltage depends on the specific circuit design and circuit parameters. In practical cases, the unbalance can be large enough to be a serious detriment.

In accordance with the present invention, a voltage-unbalance sensor 24 senses the deviation of the capacitor voltage from its intended value, and applies that signal to an unbalance-signal processor 140. The unbalance-signal processor 140 applies properly timed modifications to the current-mode controller such that the unbalance is reduced. The current-mode controller 64 feeds back timing pulses to the unbalance signal processor 140. As is conventional, a current sensor 50 monitors the power converter 120 and provides an indication of the current to the current-mode controller 64. A number of different circuits are described below for performing the functions required by the circuitry of the present invention. It should be understood that one of ordinary skill in the art could assemble a circuit of the present invention in many different ways, using any of several possible circuits for each of the functional blocks described above.

Figure 2:
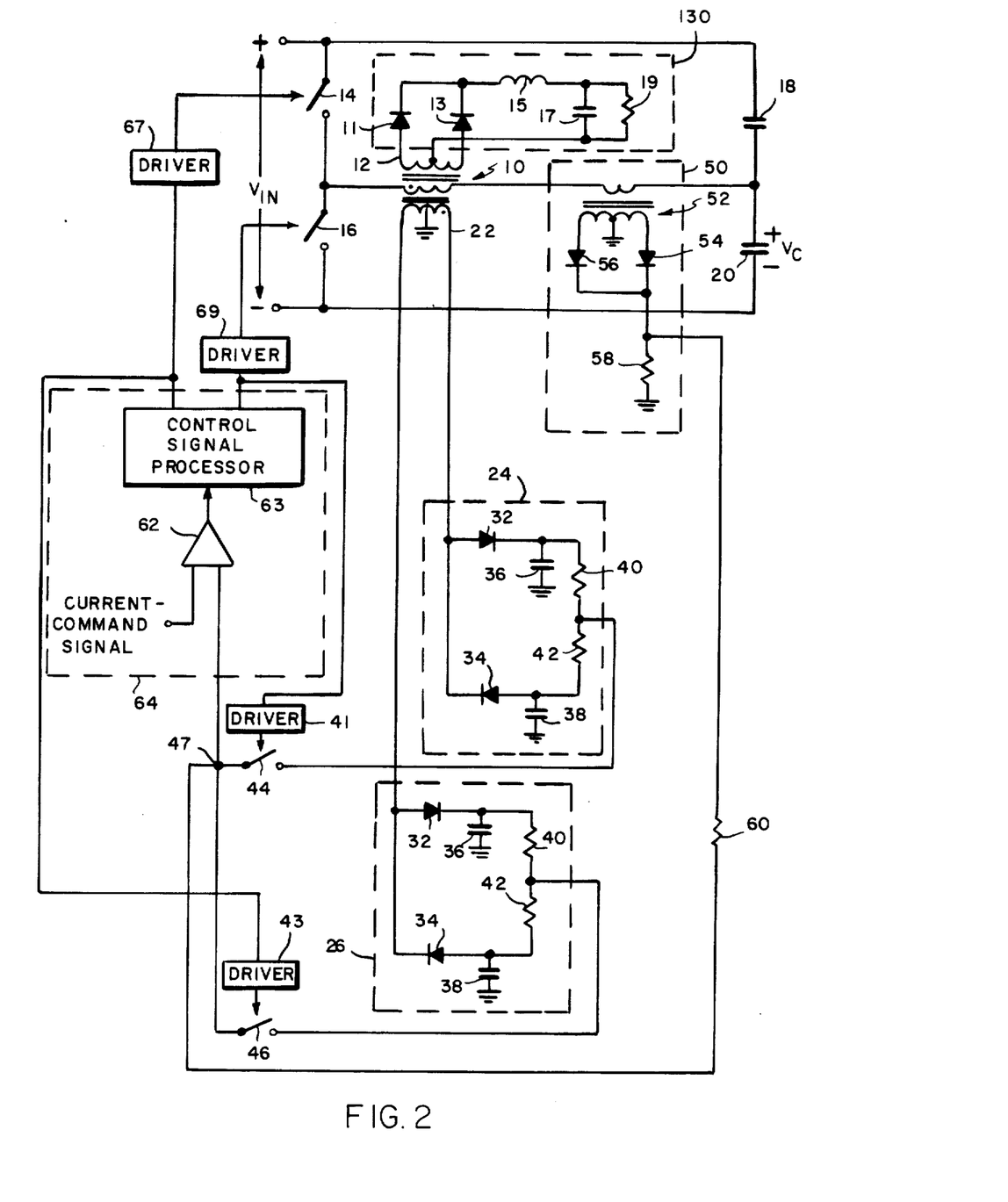
FIG. 2 is a schematic diagram of the preferred embodiment of the circuit of the present invention.

The usual mode of operation of the power converter 120 involves two switches (switches 14 and 16 in the half-bridge converter illustrated in FIG. 2), or two pairs of switches in a full-bridge converter, which operate sequentially, alternating between injecting current into the coupling capacitance (capacitors 18 and 20 in FIG. 2) and withdrawing current from it. (It should be understood that a power converter could be designed with more than two switches or switch pairs, or could be designed to inject current into the coupling capacitance on several successive timing pulses, and to withdraw current on several successive timing pulses.) It should be understood that our discussion herein of alternate positive and negative current pulses or alternate operation of two switches should be understood to include current-pulse sequences comprising positive and negative polarities of current pulses, in which more than one pulse of a given polarity could flow before a pulse of the opposite polarity flows, and in which the current pulses can result from the action of more than two switches or switch pairs. The crucial parameter to be controlled is the net charge on the coupling capacitance, the net result of all current pulses into and out of the capacitance, and of dc current, if any (e.g., capacitor leakage current).

FIG. 2 shows the preferred embodiment of the present invention for maintaining voltage balance in a capacitively coupled power converter which uses current-mode control. To illustrate the circuit operation, we show the most common application: a half-bridge power converter with dc voltage input, transformer coupling to the load, and capacitive coupling of the primary winding of the power transformer. It should be understood that the teachings herein apply also to power converters with ac power input instead of dc power input, with current input instead of voltage input, and with other types of load circuits besides transformer-coupled (e.g., direct drive of the load by the power converter, through the coupling capacitance).

The power converter includes a first switch 14 and a second switch 16 connected in series. A dc input voltage $V_{IN}$ is provided to the power converter across the series combination of the first switch 14 and second switch 16. A power transformer 10 couples the load circuit 130 to the power converter. The transformer 10 is connected at one end between the first switch 14 and second switch 16. The power transformer 10 produces a power output to the load circuit 130 through a first secondary winding 12. As an example of a common use of the output of such a power converter, secondary winding 12 drives a pair of rectifier diodes 11 and 13. Rectified output is obtained at the cathodes of diodes 11 and 13. The ac ripple in that output is filtered by choke 15 and capacitor 17. The filtered dc power is supplied to the load, represented here as an equivalent resistance 19.

The power converter further includes capacitive coupling between the first and second switches and the power transformer 10, the coupling is provided by a first capacitor 18 and a second capacitor 20. The input voltage $V_{IN}$ is provided by a conventional source of dc power. One possible source is a full-wave bridge rectifier. When the full-wave bridge rectifier is used the two series-connected capacitors 18 and 20 serve two functions: (a) energy-storage at the rectifier output, and (b) capacitive coupling for the primary winding of power transformer 10. Instead of two coupling capacitors, a single capacitor may be used in any of a number of different arrangements. A single capacitor can be used at the location of either capacitor 18 or 20, or the primary of transformer 10 can be connected in series with a single capacitor; the series combination of primary winding and capacitor can be connected between the junction of switches 14 and 16 and either the positive or the negative end of $V_{IN}$.

In order to allow the power converter to be controlled by a current-mode controller, in FIG. 2, the voltage across capacitor 20 must be prevented from running away. The desired relationship between the capacitor voltage $V_c$ across capacitor 20 and the input voltage $V_{IN}$ is for the capacitor voltage to be equal to half of the input voltage. It is an object of the present invention to provide a means for sensing and correcting any deviation from this relationship so that current-mode control may be used in a capacitively coupled power converter.

In accordance with the present invention, the transformer 10 has a second secondary winding 22. The second secondary winding 22 shall be called the sensing winding. Its center-tap is connected to ground. One end of the sensing winding 22 is connected to a first voltage-unbalance-sensing circuit 24. The other end of the winding 22 is connected to an identical second voltage-unbalance-sensing circuit 26. The voltage-unbalance-sensing circuits each produce an unbalance signal which is a monotonically increasing or decreasing function of the deviation of the capacitor voltage $V_c$ from the nominal voltage of half the input voltage. The two voltage-unbalance-sensing circuits 24 and 26 should produce unbalance signals of the same amplitude, but opposite polarity. The unbalance signal from voltage-unbalance-sensing circuit 26 is used for modifying the control of the first switch 14 and the other unbalance signal from voltage-unbalance-sensing circuit 24 is used for modifying the control of the second switch 16. Each of the voltage-unbalance-sensing circuits includes two sample-and-hold-type circuits. One sample-and-hold circuit samples the amplitude of the voltage pulse generated by switch 14 and the other circuit samples the amplitude of the voltage pulse generated by switch 16. A simple sample-and-hold circuit comprising a diode, a capacitor, and a discharge resistor is used in the presently preferred embodiment of FIG. 2.

The voltage-unbalance-sensing circuits 24 and 26 of the presently preferred embodiment include a first diode 32 whose anode is connected to on end of the transformer winding 22 and a second diode 34 whose cathode is connected to the same end of the transformer winding 22. The diodes 32 and 34 rectify the voltage of transformer winding 22 onto storage capacitors 36 and 38, respectively. The voltage across capacitor 36 is proportional to the amplitude of the positive pulse across winding 22 and the voltage across capacitor 38 is proportional to the amplitude of the negative pulse across winding 22. An unbalance signal proportional to the difference between the magnitudes of the positive and negative pulses can be developed with a resistive summer shown as resistors 40 and 42. Resistors 40 and 42 serve two functions: (a) summing the positive and negative voltages of capacitors 36 and 38, and (b) providing discharge path for capacitors 36 and 38. Without discharge the voltage across a capacitor would not be able to follow the change in the amplitude of the voltage of the driving source.

Figure 4:
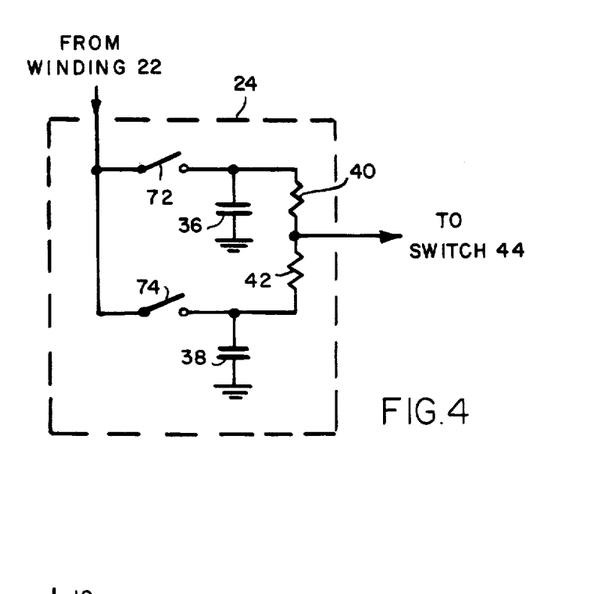
FIG. 4 is an alternate embodiment of the voltage-unbalance sensor of the present invention.

It should be understood that any other type of sample-and-hold circuit may be used, e.g., the one shown in FIG. 4. In the circuit of FIG. 4, the switches 72 and 74 are substituted for the diodes 32 and 34. The switches 72 and 74, together with the capacitors 36 and 38, perform the sample-and-hold function. The switches are controlled by signals derived from the timing pulses generated by the current-mode controller 64 or by the pulses appearing on the sensing winding 22 of transformer 10. The operation of the circuit is basically the same as that of the preferred embodiment of FIG. 2.

The unbalance signal from each of the voltage-unbalance-sensing circuits is provided through a switch into the current comparator 62 of the current-mode-control circuitry. In FIG. 2, switches 44 and 46 are shown connected to the voltage-unbalance-sensing circuits 24 and 26, respectively. Switches 44 and 46 alternate in the same manner as switches 14 and 16 so as to provide a modification signal to junction 47. At junction 47, the modification signal is provided alternately from unbalance sensors 24 and 26. Switch 44 is closed and opened at the same time that switch 16 is closed and opened. Switch 46 is closed and opened at the same time that switch 14 is closed and opened. The unbalance signal processed through switch 44 is provided in the modification signal to modify the control signal to switch 16 and the unbalance signal processed through switch 46 is provided in the modification signal for correcting the control signal to switch 14. The operation of switches 44 and 46 is controlled by timing pulses derived from the current-mode controller 64 or alternatively from transformer 10 of the power converter. However, it is preferable that switches 44 and 46 be driven by signals whose amplitudes are independent of the voltages applied to transformer 10. That will ensure proper operation of those switches even if the transformer winding voltages are smaller than required to supply the drive signals to the switches, as a result of a transient voltage unbalance or low $V_{IN}$.

One of ordinary skill in the art may select an appropriate current-sensing circuit and a known current-mode-control method for use in conjunction with any particular power converter. In the embodiment of FIG. 2, a conventional current-sensing circuit 50 is shown. A current transformer 52 senses the current in the primary winding of the transformer 10. The current transformer 52 is tapped to ground at the center of its secondary winding. Each end of the tapped winding of transformer 52 is connected to a diode. The diodes 54 and 56 rectify the signals from the current-sensing transformer 52. The rectified signal is scaled by a resistor 58. Other current-sensing means could be used instead of that shown in FIG. 2, for example, a sensing resistor in series with primary winding or the power switches, a Hall-effect cell sensing the magnetic field in the vicinity of a conductor carrying the current to be sensed, or two separate current transformers in series with switches 14 and 16.

The current-sensing circuit 50 provides a current signal to a resistor 60. The current signal is then added at junction 47 to the modification signal. The preferred way of adding the current signal and the modification signal is with a resistive summer comprising the sum of the resistances of resistors 58 and 60 and the parallel resistance of resistors 40 and 42. The resulting signal is provided into a current comparator 62. The current comparator 62 outputs a trigger signal to a control signal processor 63. The control signal processor 63 is constructed in accordance with known principles and designs of current-mode-control circuits. The trigger signal from current comparator 62 goes high if the sum of the current signal and the modification signal exceeds the threshold set by the currentcommand signal applied to the other input of the comparator. Thus, the type of current-mode control shown in FIG. 2 operates on the basis of the magnitude of the current sensed in the power converter as modified by the unbalance signals. The current-mode controller will turn one of the two switches 14 or 16 off when the magnitude of the current signal as modified matches the current-command signal.

The source of the current-command signal depends on the application of the equipment. In the most frequent application of current-mode control in dc/dc converters with one or more regulated dc output voltages, the current-command signal comes from a voltage-error amplifier. The voltage-error amplifier compares a reference voltage with a sample of the output voltage and produces an amplified error voltage. This amplified error voltage then sets the threshold of the current comparator to control the switch currents such as to maintain a regulated output voltage of the power converter. In other applications, the source for the current-command signal is programmed by an external controller. The various techniques for providing a current-command signal are known by those skilled in the art related to current-mode-control circuits.

The signal from the current comparator 62 is fed into a control-signal processor 63. The control-signal processor 63 generates timing pulses which cause driver 67 or driver 69 to turn off switch 14 or 16, whichever was in the conducting state prior to the turn-off command. Then the control signal processor turns on the other switch after a certain time delay. The timing pulses are also used in the preferred embodiment of FIG. 2 to control driver 41 and driver 43 which in turn control the turning on and off of switch 44 and switch 46 respectively. The corrections provided by the unbalance sensors are made continuously to affect the signals provided by the control-signal processor 63 to the switches 14 and 16.

Figure 3:
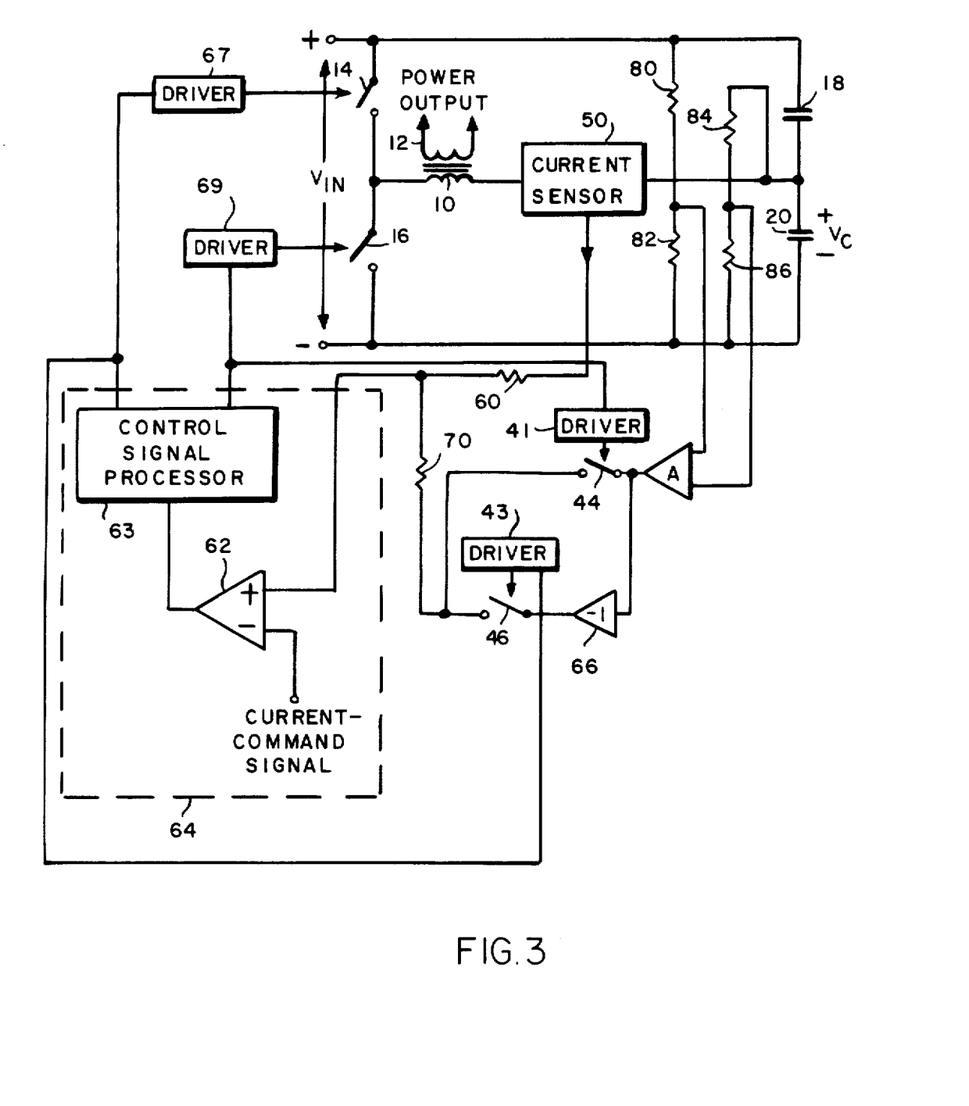
FIG. 3 is an alternate embodiment of a circuit practicing the present invention.

FIG. 3 shows an alternate embodiment of the present invention, in which the unbalance between the capacitor voltage and the desired value of half of the input voltage is determined by direct comparison. A voltage divider made up of a resistor 80 and a resistor 82 is connected across the input voltage. A second voltage divider is placed across the capacitor voltage. The second voltage divider is made up of resistor 84 and 86. When the voltage being compared are relatively high, it is desirable to make the resistors 82 and 86 relatively small in comparison to resistors 80 and 84, respectively. Thus, only a fraction of the input voltage and capacitor voltage will be compared by a difference amplifier 88. The difference amplifier 88 produces an unbalance signal which is provided to switch 44 and the input of inverter 66, preferably having a gain of −1. Switch 46 receives an opposite-polarity unbalance signal from inverter 66. The modification signal is provided through resistor 70. The rest of the circuit works as that of FIG. 2.

When the voltages being compared are relatively low, the inputs of the difference amplifier 88 can be connected to voltages of the order of the capacitor voltage $V_c$. In one alternate arrangement, resistors 80 and 82 can be nominally identical in value, resistor 86 can be omitted, and resistor 84 can be replaced by a direct connection.

Figure 5:
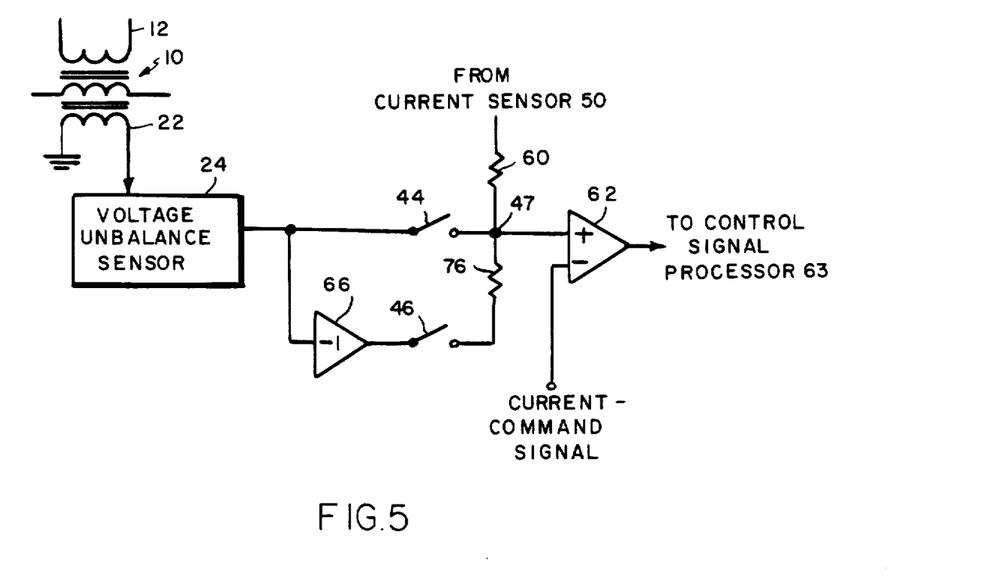
FIG. 5 shows a modified embodiment of the unbalance-signal processor of the present invention.

FIG. 5 is an example of an alternative embodiment of the preferred embodiment of FIG. 2 for generating unbalance signals of opposite polarity. Here, we can use an untapped secondary winding 22 instead of the center-tapped secondary winding of FIG. 2. Also, only one voltage-unbalance-sensing circuit 24 is needed. The required opposite-polarity unbalance signal is generated by an inverting amplifier 66. In order to ensure that the modification signal acts symmetrically for the two unbalance signals, a resistor 76 is connected in series with switch 46. One obtains symmetrical modification if the gain of the inverter 66 is −1 and the resistance of resistor 76 plus the output resistance of inverter 66 is equal to the output resistance of the voltage-unbalance sensor 24. As will be explained below, symmetrical modification gives better performance of the circuit than asymmetrical modification but for some applications asymmetrical modification may be satisfactory.

In a limited-performance embodiment of the invention, one can omit the voltage-unbalance-sensing circuit 26, the switch 46 and the half of the winding 22 which drives the voltage-unbalance sensor 26. This configuration does not make possible, however, the symmetrical modification signal achieved by the preferred embodiments. While this method is satisfactory in nominal operation, it can produce latch-up at the start-up of the converter or at overload condition. The symptom of latch-up is that the voltage $V_c$ across capacitor 20 becomes nearly equal to either $V_{IN}$ or zero and it will remain there until a significant change in the operating conditions of the system alters this. At latch-up, the amplitude of the pulse appearing on the output winding 12 of the transformer 10 is not enough to turn on the appropriate rectifier 11 or 13. Therefore a current pulse will not flow in the primary windings of power transformer 10 and current-sensing transformer 52. Then the output of the current sensor 50 will be zero during the conduction time of the relevant switch (switch 14 if $V_c$ is close to $V_{IN}$, and switch 16 if $V_c$ is close to zero). The relevant switch will be "on" for the maximum possible time allowed by the control-signal processor 63, but since it cannot remain "on" any longer, the peak value of the current of the switch cannot be increased. If, however, the current in the other switch is *decreased* by current-threshold modification, latch-up will not occur. That can be ensured by providing modifications to the commanded currents for *both* switches, as is done in the circuits of FIGS. 2, 3, 5, 6, and 7.

Figure 6:
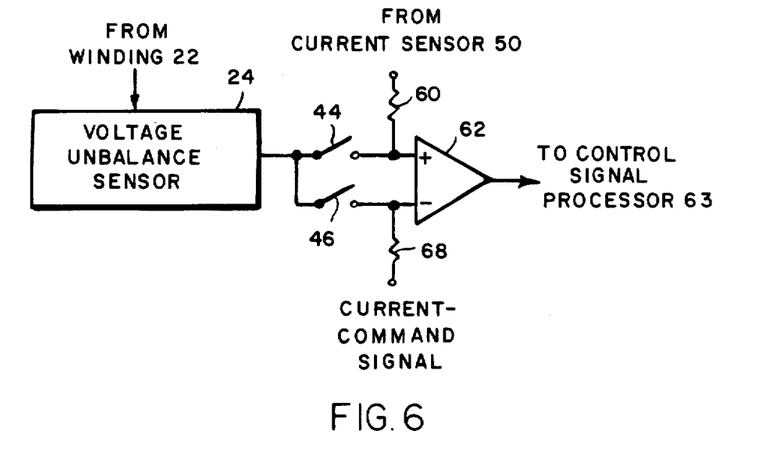
FIG. 6 shows a second modified embodiment of the unbalance-signal processor of the present invention.

FIG. 6 gives another alternative embodiment of the invention. Here, there is only one voltage-unbalance-sensing circuit 24, driven by an untapped sensing winding 22 on the output transformer 10. The output of the voltage-unbalance sensor 24 is connected alternatively to the inverting input and the non-inverting input of the current comparator 62, by the switches 44 and 46. One of the inputs of comparator 62 is connected to the output of the current sensor 50 through resistor 60. The other input of comparator 62 is connected to the source of the current-command signal through the resistor 68. For symmetrical modification of the current threshold the resistance of resistor 68 should be approximately equal to the resistance of resistor 60 but satisfactory operation can be obtained over a relatively wide range of resistance. The advantage of the embodiment of FIG. 6 over the embodiment of FIG. 2 is that it requires fewer components. However, it can be used only when both inputs of the current comparator 62 are accessible to the user.

Figure 7:
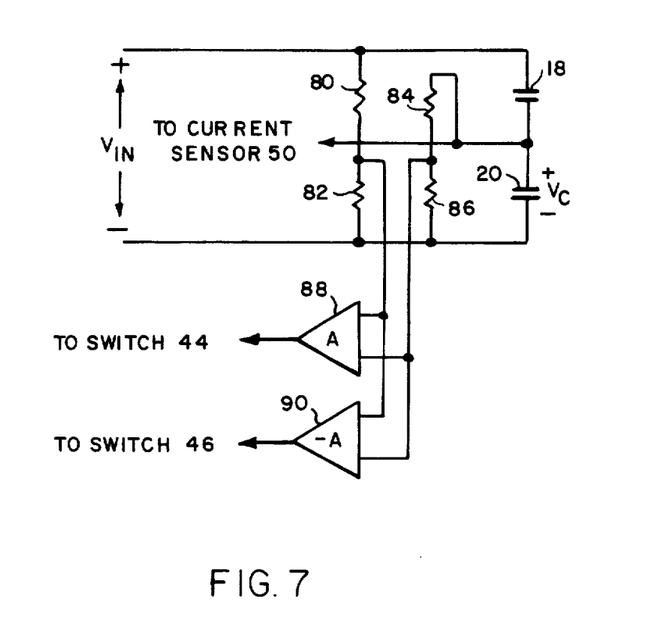
FIG. 7 shows an alternate arrangement for generating symmetrical voltage-unbalance signals instead of the arrangement shown in FIG. 3.

FIG. 7 gives an alternative embodiment of the unbalance-signal-processing circuitry of FIG. 3. Instead of generating an opposite-polarity unbalance signal by passing the unbalance signal through an inverter 66, one can use two difference amplifiers 88 and 90. The two difference amplifiers differ in the sign of their gain. To obtain a symmetrical modification signal, the absolute values of the gains should be equal, but satisfactory operation can be obtained over a fairly wide range of gain ratios.

Figure 8:
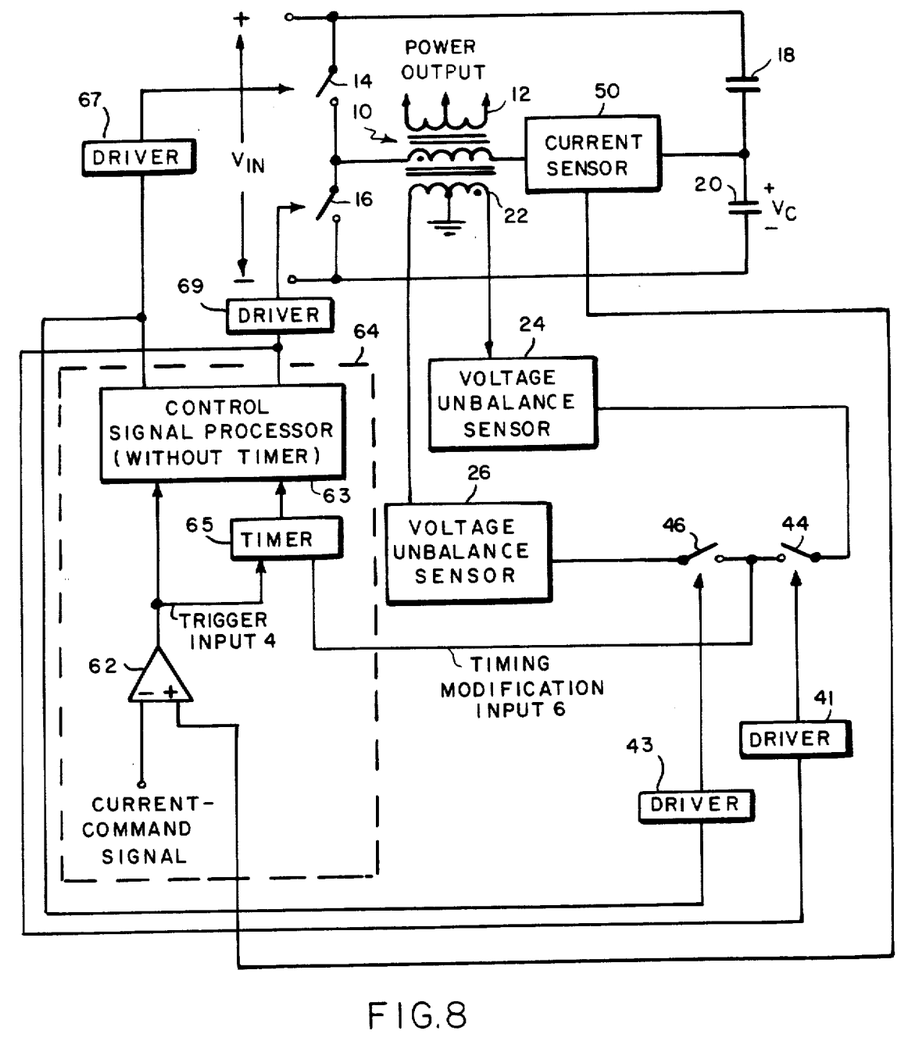
FIG. 8 is a block diagram of an alternate embodiment of the present invention.
Figure 9:
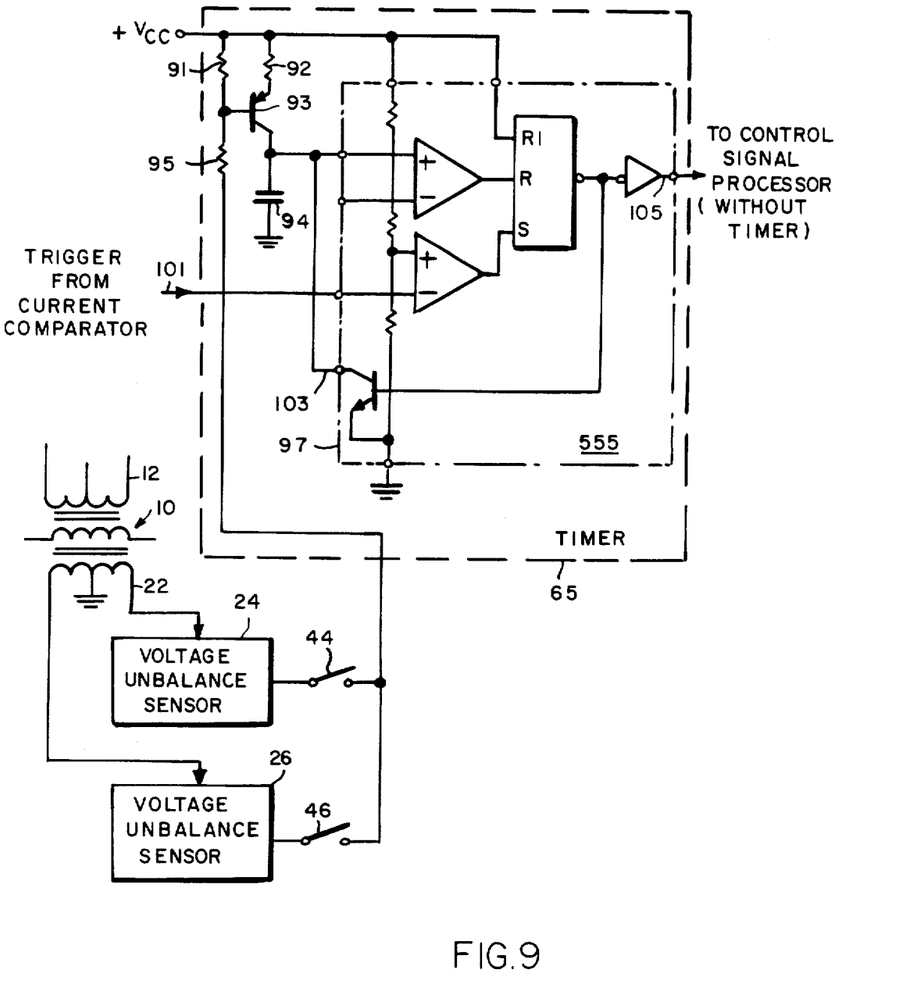
FIG. 9 shows a circuit diagram including an example embodiment of the timer of FIG. 8.

In the embodiments of the invention discussed above the corrections for unbalance modify the magnitude of sensed-current signal which will cause a trigger signal to be issued by the current comparator 62. FIG. 8 shows an alternate technique which can be used with the constant-"on"-time, constant-"off"-time and constant-frequency methods of current-mode control. (Those three methods of current-mode control are discussed in the Redl and Sokal article in the PESC '85 Proceedings identified above.) In this method, the unbalance signal modifies one or more of the timing parameters of switch conduction, instead of the magnitude of the sensed-current signal. In this method, the designer can choose to modify any of the following timing parameters, or any combination of them: the switch "on" time, the switch "off" time, or the switching repetition period. Similarly to the alternating increase and decrease of the magnitude of the sensed-current signal described previously, the commanded time intervals are alternately increased and decreased in accordance with the unbalance signal. "On"-time modification can be used with constant-"on"-time current-mode control; "off"-time modification can be used with constant-"off"-time current-mode control; and modification of the repetition period can be used with constant-frequency current-mode control. In FIG. 8, the timer 65 associated with the control-signal processor 63 performs one of three different functions, depending on which method of current-mode control was chosen by the designer. In a constant-frequency controller, timer 65 provides a clock signal which initiates each cycle of switching operation for the system. In a constant-"off"-time controller, it sets the "off" time of switches 14 and 16. In a constant-"on"-time controller, it sets the "on" time of switches 14 and 16. Voltage balance is achieved by appropriately modifying the switch-conduction duty ratios by modifying the "on" or "off" pulse width or the repetition period. That is done by applying, to the timing modification input 6, a control signal obtained from the voltage-unbalance sensors 24 and 26, via the alternately operated switches 44 and 46. As an example of a specific implementation of the block diagram of FIG. 8, FIG. 9 shows a circuit for alternately lengthening and shortening the pulse duration in accordance with signals from a pair of voltage-unbalance sensors. As drawn in FIG. 9, the circuit is applicable to the constant-"on"-time and constant-"off"-time methods of current-mode control. It can be adapted for use with the constant-frequency method of current-mode control by supplying the timer's trigger-input terminal 101 from the timer's output transition instead of from the transition of the current comparator as shown in FIG. 9.

The example embodiment of FIG. 9 generates timing pulses with a timer integrated circuit 97. In this example, we use the well-known industry-standard timer integrated circuit, type 555. After receiving a negative-going trigger signal at the timer's trigger input 101, the discharge transistor in the integrated circuit turns off. Then the capacitor 94 connected to node 103 will be charged by the current flowing out from the collector of current-source transistor 93. At the beginning of the charging process, the output 105 of the integrated circuit 97 goes from "low" state to "high" state and remains in that state during the capacitor-charging time. The charging process ends when the voltage at node 103 exceeds ⅔ of the supply voltage $V_{cc}$. At that time, the output of the integrated circuit 97 goes "low" and capacitor 94 is discharged by the discharge transistor to approximately zero voltage. The circuit then becomes ready to receive another trigger signal and perform another timing cycle. The duration of the pulse generated by timer integrated circuit 97 is inversely proportional to the current injected into capacitor 94 from the output of the current source comprising transistor 93 and resistors 91, 92 and 95. The current output is delivered from the collector of transistor 93. That current is a linear function of the voltage applied to the lower end of resistor 95. That voltage is alternately made larger and smaller on successive timing cycles by the outputs of voltage-unbalance sensors 24 and 26, connected to resistor 95 on alternate timing cycles via switches 44 and 46.

It must be understood that various changes and modifications to the embodiments described above will be apparent to those skilled in the art. The modification signal may be applied equivalently to either the sensed current signal or the current-command signal if proper signal polarity is provided. Also, a variety of means may be employed to generate unbalance signals of opposite polarity or to modify the sensed-current signal into the current comparator. These and other changes can be made without departing from the spirit and the scope of the invention and without diminishing its attendant advantages. It is therefore intended that such changes and modifications be covered by the following claims.

We claim:

1. A capacitively coupled power converter circuit controlled by a current mode controller comprising:
   first and second switches connected in series;
   means for applying an input voltage across said first and second switches;
   means for providing power to a load;
   capacitor means for capacitively coupling the voltage received from said switches with said power providing means, said capacitor means having a capacitor voltage;
   a pair of sample and hold circuits for comparing the input voltage and the capacitor voltage and for generating a first unbalance signal as a function of the comparison;
   unbalance signal processing means for receiving said first unbalance signal and for generating a modification signal; and
   means for providing said modification signal to said current mode controller.

2. The circuit of claim 1 wherein said first means for comparing and generating further comprises two resistances connected to each other, each resistance being connected to one of said pair of sample and hold circuits.

3. The circuit of claim 2 wherein each of said sample and hold circuits comprises a diode and a capacitor.

4. The circuit of claim 2 wherein each of said sample and hold circuits comprises a switch and a capacitor.

5. The circuit of claim 1 further comprising:
   a second means for comparing the input voltage and the capacitor voltage and for generating a second unbalance signal as a function of the comparison, and wherein said unbalance signal processing means further includes means for receiving said second unbalance signal, said modification signal being generated by alternately providing said first unbalance signal and said second unbalance signal synchronously with the switching of said first and second switches.

6. The circuit of claim 1 wherein said means for providing power to a load comprises a transformer.

7. The circuit of claim 1 wherein said capacitor means comprises two capacitors in series connected across the input voltage, the capacitor voltage being the voltage across one of said capacitors.

8. The circuit of claim 1 wherein said first means for comparing and generating comprises a comparator having one input from a voltage divider across said input voltage and a second input from a voltage divider across the capacitor voltage.

9. A capacitively coupled power converter circuit controlled by a current mode controller comprising:
   first and second switches connected in series;
   means for applying an input voltage across said first and second switches;
   means for providing power to a load;
   capacitor means for capacitively coupling the voltage received from said switches with said power providing means, said capacitor means having a capacitor voltage;
   first means for comparing the input voltage and the capacitor voltage and for generating a first unbalance signal as a function of the comparison;
   unbalance signal processing means for receiving said first unbalance signal and for generating a modification signal by alternately providing said unbalance signal and an inverse of said unbalance signal, the alternation being synchronous with the switching of said first and second switches; and
   means for providing said modification signal to said current mode controller.

10. A capacitively coupled power converter circuit controlled by a current mode controller comprising:
    first and second switches connected in series;

means for applying an input voltage across said first and second switches;

means for providing power to a load;

capacitor means for capacitively coupling the voltage received from said switches with said power providing means, said capacitor means having a capacitor voltage;

first means for comparing the input voltage and the capacitor voltage and for generating a first unbalance signal as a function of the comparison;

an inverting differential amplifier for generating a second signal which is the inverse of the first unbalance signal;

unbalance signal processing means for receiving said first unbalance signal and for generating a modification signal; and means for providing said modification signal to said current mode controller.

11. A capacitively coupled power converter circuit controlled by a current mode controller comprising:

first and second switches connected in series;

means for applying an input voltage across said first and second switches;

means for providing power to a load;

capacitor means for capacitively coupling the voltage received from said switches with said power providing means, said capacitor means having a capacitor voltage;

first means for comparing the input voltage and the capacitor voltage and for generating a first unbalance signal as a function of the comparison;

unbalance signal processing means for receiving said first unbalance signal and for generating a modification signal, said unbalance signal processing means including two processing switches which alternately switch on and off synchronously with the switching of said first and second switches; and means for providing said modification signal to said current mode controller.

12. A capacitively coupled power converter circuit controlled by a current mode controller comprising:

first and second switches connected in series;

means for applying an input voltage across said first and second switches;

means for providing power to a load;

capacitor means for capacitively coupling the voltage received from said switches with said power providing means, said capacitor means having a capacitor voltage;

first means for comparing the input voltage and the capacitor voltage and for generating a first unbalance signal as a function of the comparison;

second means for comparing the input voltage and the capacitor voltage and for generating a second unbalance signal as a function of the comparison, the comparison being made in such a way that the polarity of the second unbalance signal is the inverse of the polarity of the first unbalance signal;

unbalance signal processing means for receiving said first and second unbalance signals and for generating a modification signal by alternatively providing said first unbalance signal and said second unbalance signal synchronously with the switching of said first and second switches; and means for providing said modification signal to said current mode controller.

13. The circuit of claim 12 wherein said first means for comparing and generating comprises a pair of sample and hold circuits.

14. The circuit of claim 13 wherein said first means for comparing and generating further comprises two resistances connected to each other, each resistance being connected to one of said pair of sample and hold circuits.

15. The circuit of claim 13 wherein each of said sample and hold circuits comprises a diode and a capacitor.

16. The circuit of claim 13 wherein each of said sample and hold circuits comprises a switch and a capacitor.

17. The circuit of claim 12 wherein said capacitor means comprises two capacitors in series connected across the input voltage, the capacitor voltage being the voltage across one of said capacitors.

18. The circuit of claim 12 wherein said unbalance signal processing means comprises two processing switches which alternately switch o and off synchronously with the switching of said first and second switches.

* * * * *

UNITED STATES PATENT AND TRADEMARK OFFICE
CERTIFICATE OF CORRECTION

PATENT NO. : 4,719,559
DATED : January 12, 1988
INVENTOR(S) : Nathan O. Sokal, Richard Redl It is certified that error appears in the above-identified patent and that said Letters Patent is hereby corrected as shown below:

Column 5, line 5, please delete "on" and substitute --one--.

Column 12, line 41, please delete "o" and substitute --on--.

Signed and Sealed this

Fourteenth Day of June, 1988

Attest:

DONALD J. QUIGG

Attesting Officer

Commissioner of Patents and Trademarks